Aug. 29, 1939.　　　F. McALLISTER　　　2,170,866
INTERNAL EXPANSION STOPPER
Filed April 1, 1938
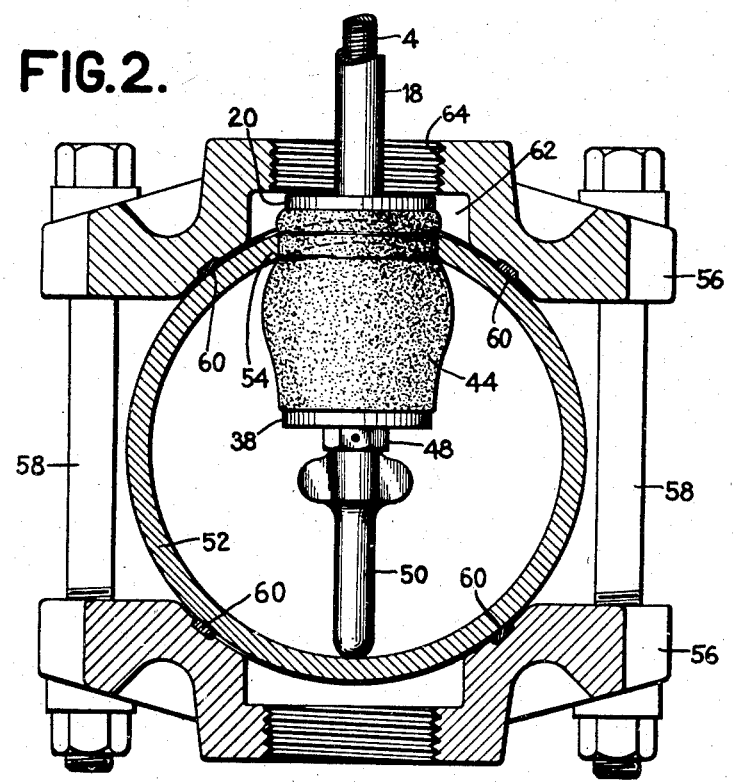
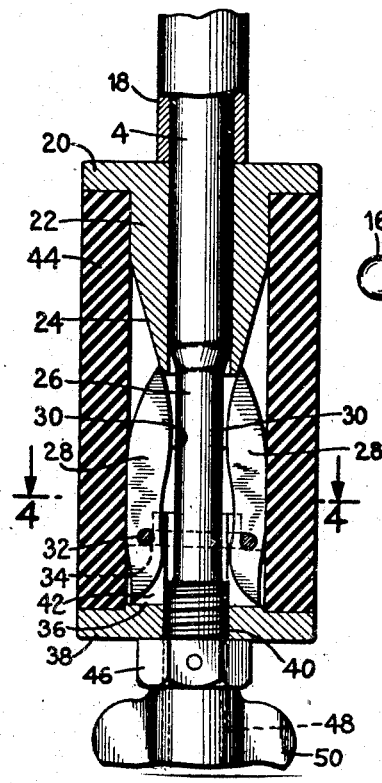
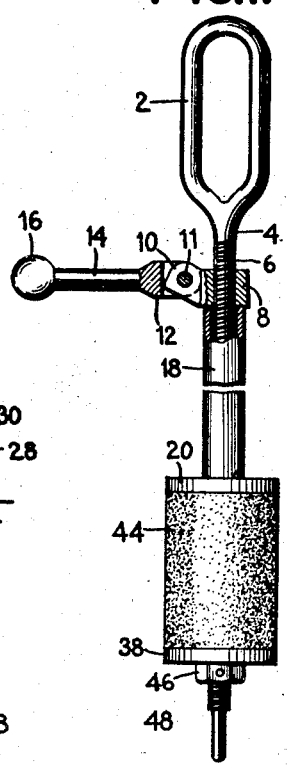
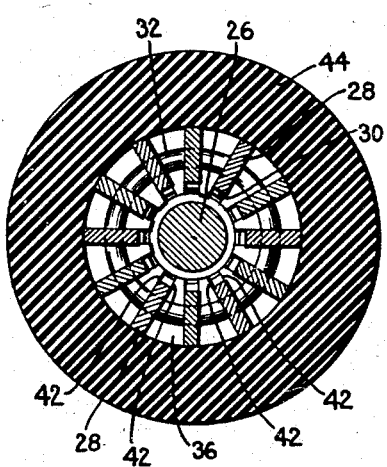
INVENTOR
*FRANKLIN McALLISTER*
BY
*Orton and Griswold*
ATTORNEYS Patented Aug. 29, 1939

2,170,866

UNITED STATES PATENT OFFICE 2,170,866

INTERNAL EXPANSION STOPPER

Franklin McAllister, Flushing, N. Y.

Application April 1, 1938, Serial No. 199,449

6 Claims. (Cl. 220—24.5)

This invention relates to an expansible stopper for closing openings in a fluid tight manner.

In the installation, servicing or dismantling of fittings for containers, conduits and the like, when in service, it is frequently necessary to prevent the escape of the fluid within the containers and conduits. Various suggestions have been made and means provided for closing the openings in such containers and conduits during installation and repairs but the devices heretofore known were of limited application and either ineffective to provide a satisfactory liquid or gas tight seal or alternatively had relatively short lives.

Effective stoppers are particularly necessary in the art of distributing combustible gases, as for example, when it is necessary to tap a main to install a service connection to an adjacent building. Another related problem that frequently arises is the repair of fittings which, through corrosion, wear and tear, street vibration or otherwise, have become incapable of retaining the combustible gases.

One of the usual methods for tapping a gas main comprises the drilling of a hole into the main and placing over the main at that point either a saddle or sleeve to provide the necessary support for the pipe fittings to convey the combustible gas from the main to the consumer. Such saddles or sleeves are not infrequently disturbed, as by vibration caused by traffic on the street above, settling of the earth as well as other causes. When the saddles or sleeves are disturbed or broken, gas may be discharged and seeks an outlet through the ground above. Such leaks may, if they continue, become very hazardous and dangerous to life and property so every effort is made to repair them as soon as they are discovered. To make repairs, a hole is dug from the surface toward the main at the point where it is tapped. Removal of the overlying dirt may permit very rapid escape of the gas making it impossible for the workmen to continue without recourse to gas masks and other artificial protection.

The fittings at the tapped portion of the main may be corroded and extremely difficult to remove requiring a great deal of time to be spent in the gas filled hole. The stopper forming the subject matter of this invention is particularly useful in stopping the flow of gas in a simple and expeditious manner without having to remove the principal fittings adjacent the tapped portion of the main.

Although this stopper is particularly useful for the purposes mentioned above, it is of general utility and may be employed in any case where it is desired to make a fluid tight closure for a substantially circular opening.

This invention, therefore, seeks to provide a plug or stopper which has a relatively high degree of positive expansion whereby the plug may be inserted through relatively small openings and yet be expanded to close openings substantially larger than that through which the plug has been inserted.

Another object resides in providing an expansible plug having means to position the plug with reference to the opposite wall of the apertured fluid conduit.

An important object of this invention resides in the provision of an internally expanded plug for positively engaging the sides of the plug with an aperture.

It is likewise an object to provide a stopper for closing substantially circular openings comprising a hollow deformable plug mounted on a rod.

The foregoing and other related objects which which will either be set forth or apparent from the sequent description are all embraced within this invention which is illustrated as to a preferred embodiment on the attached sheet of drawings in which:

Figure 1 is a view principally in elevation of the complete tool or stopper;

Figure 2 is a view partly in cross-section showing the tool used for stopping the tapped hole in a gas main;

Figure 3 is a view principally in section of the expansible portion of the stopper; and Figure 4 is a view in cross-section taken along the lines 4—4 of Figure 3.

Referring to the drawing and particularly Figure 1, the internal expansion stopper comprises a handle portion 2 in the form of a loop on the end of a rod 4, which is threaded along the portion 6 adjacent the handle 2 to receive a threaded collar 8 having a projecting lug 10 to receive the bifurcated end 12 of a rotatable handle 14 pivotally connected by means of the pin 11 and conveniently provided with a rounded end 16. Freely slidable on the rod 4 is a sleeve 18 engaging the lug 10 at one end and at the other a disc 20. The disc 20 also includes a cylindrical portion 22 terminating in a cam surface shown as a conical portion 24 also slidably mounted on the rod 4.

Adjacent the end of the conical portion 24, the rod 4 is of decreased diameter 26. Around the portion of the rod 26 of decreased diameter are arranged a plurality of fingers 28 each provided with a curved cam surface 30 to engage the conical portion 24. The fingers 28, at their ends opposite the conical portion 24 are pivoted on a ring 32 carried on a shoulder 34 of a cylindrical member 36 attached to a second disc 38 which is threaded to a slightly enlarged portion 40 of the rod 4, 26. The lower end of the fingers 28 are held not only by the ring 32 but also positioned by slots 42 in the cylindrical member 36 as is best seen in Figures 3 and 4. Between the two discs 20 and 38 is a cylindrical element 44 made of a resilient deformable material conveniently rubber. The outer diameter of the cylindrical element 44 is substantially the same as the discs 20 and 38 or slightly larger. In some case it may be desirable to slightly taper the cylindrical plug element 44 toward the lower disc 38. To prevent rotation of the disc 38, threaded to the rod at 40, a lock nut 46 with or without a cotter key may be provided. The rod 4, 26 is extended beyond the portion engaged by the lock nut for a short distance as at 48 to properly position the expansible cylindrical member 44 when used with the smallest sized usual conduit. In some cases it may be desirable to omit all except a very short extension 48 of the rod 4, 26 but a short portion should be retained so that an auxiliary extension 50 may be attached to the end of the stopper. The auxiliary extension 50 may be of any length and in many instances a plurality of extensions of different lengths will be desirable as hereinafter described.

From the description thus far, it will be evident that with the parts arranged as described the resilient cylindrical element 44 will normally hold the discs 20 and 38 apart and in the position shown in Figure 3. Actuation of the handle 14 by rotating it about the rod 4 will move the sleeve 18 downwardly against the disc 20. This downward movement of the disc 20 causes a corresponding movement of the conical member 24 sliding the conical cam surface thereof under the cam surfaces 30 of the fingers 28 which are thereby pivoted on the ring 32 and exert a pressure on the inside to expand the plug 44. Correspondingly, the movement of the discs 20 and 38 toward each other also tends to bulge the expansible cylindrical member 44 so that there is a combination of forces tending to increase the diameter of the expansible member producing positive action and insuring a tight fit with the circumference of any opening within which the plug may be positioned. Rotation of the handle 14 in the opposite direction relieves the pressure on the disc 20 which is moved away from the disc 38 under the influence of the cylindrical resilient element 44 withdrawing the cone 24 from under the fingers 28.

In Figure 2 is illustrated one of the uses for an expansible plug of the type forming the subject matter of this invention. A conduit 52 has been tapped by drilling a hole 54 therein. Since the thickness of the pipe or conduit 52 at the hole 54 is not sufficient to support a large fitting, a saddle comprising two complementary members 56 is mounted thereon and held in position by bolts 58. Gaskets 60 prevent leakage of any gas from within the chamber 62 along the surface of the conduits 52.

In normal installations, it is customary to screw a T fitting into the threaded opening 64 of one of the saddle elements 56. The horizontal opening of the T is connected to the service pipe while the opening at the top is generally closed by a readily removable metal screw plug. As above described, leaks occur in installations of this type and the escape of gas may be so great as to make it difficult to work in the hole for a sufficient length of time to remove the fittings and otherwise close the opening in the main conduit 52. With the stopper forming the subject matter of this invention, it is simply necessary to remove the metal screw plug normally closing the upper opening of the T. The stopper of this invention may then be inserted through the T until the end of the rod 48, or as shown in Figure 2, the end of the auxiliary projection 50, engages the opposite side of the main conduit 52 which will properly position the plug so that the expansible portion 44 will close the hole 54 in the conduit 52 when the handle 14 is rotated in a manner to exert pressure forcing the discs 20 and 38 toward each other. The auxiliary projection 50 eliminates all guess work as to the position of the opening 52 and the plug is not likely to be positioned so as to hold the T fitting and saddle to the main but they can be worked upon and removed without disturbing the closure of the hole 52.

The removal of the T fitting and the saddle 56 is insured by the construction of the handles 2 and 14. Handle 14 may be pivoted about the pin 11 to lie parallel to or even within the loop handle 2 forming an extension of the rod 4 whereby the transverse dimensions of the handles do not exceed the inner diameters of either the T or the saddle which may be removed and replaced without in any manner disturbing the original seal. In other words, the handles will go through any opening through which the plug will pass when in its non-expanded condition.

While the invention has been described with particular reference to its application as a repair tool, it will be readily apparent that it may also be successfully used for the installation of service pipes and in all other situations where a positive closure of an opening is desired as well as for closing tubes.

Having thus described my invention with particular reference to a preferred embodiment this is to be considered as illustrative rather than a limitation of the invention.

What is claimed is:

1. A stopper for closing substantially circular openings comprising a deformable plug member having a rod passing through its axis, retaining means on the rod in contact with one end of the plug, a portion of which extends into the plug, a plurality of fingers pivoted on said extension, a second retaining means on the rod in contact with the opposite end of the plug provided with an extension into the plug having a conical surface and means on the rod for forcing the two retaining members toward each other and the conical extension against the fingers to pivot them outwardly about their pivots.

2. A stopper for closing substantially circular openings comprising a hollow cylindrical deformable plug member having a rod passing through its axis, retaining means fixed on the rod in contact with one end of the plug, a plurality of fingers pivoted on said retaining means, a second retaining means on the rod in contact with the opposite end of the plug provided with an extension into the plug having a camming surface and means on the rod for forcing the two retaining members toward each other and the camming surface against the fingers to pivot them outwardly about their pivots.

3. A stopper for closing substantially circular openings comprising a deformable plug member having a rod passing through its axis, retaining means on the rod in contact with one end of the plug, a portion of which extends into the plug, a plurality of fingers pivoted on said extension, a second retaining means on the rod in contact with the opposite end of the plug provided with an extension into the plug having a conical surface and means on the rod comprising a threaded member and a handle pivoted thereto for forcing the two retaining members toward each other and the conical extension against the fingers to pivot them outwardly about their pivots, said handle being movable about its pivot from a position at right angles to the rod to a position parallel to the rod.

4. A stopper for closing substantially circular openings comprising a hollow deformable plug mounted on a rod, a plurality of pivoted fingers spaced circumferentially within said plug and means acting on said pivoted fingers to pivot said fingers outwardly and expand said plug.

5. A stopper for closing substantially circular openings comprising a hollow deformable plug mounted on a rod, a disc attached to said rod, a plurality of fingers spaced circumferentially within said plug pivoted on said disc and means acting on said fingers to pivot said fingers outwardly and expand said plug.

6. A stopper for closing substantially circular openings comprising a hollow cylindrical deformable plug member having a rod passing through its axis, retaining means fixed on the rod in contact with one end of the plug, a plurality of fingers within the plug, a second retaining means on the rod in contact with the opposite end of the plug provided with an extension into the plug having a camming surface and means on the rod for forcing the two retaining members toward each other and the camming surface against the fingers to force them outwardly and expand the plug.

FRANKLIN McALLISTER.